US010521369B1

(12) United States Patent
Mallick et al.

(10) Patent No.: US 10,521,369 B1
(45) Date of Patent: Dec. 31, 2019

(54) HOST DEVICE WITH MULTI-PATH LAYER CONFIGURED FOR PER-PROCESS DATA REDUCTION CONTROL

(71) Applicant: EMC IP Holding Company LLC, Hopkinton, MA (US)

(72) Inventors: Sanjib Mallick, Bangalore (IN); Ramesh Doddaiah, Shrewsbury, MA (US); Arieh Don, Newton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/034,603

(22) Filed: Jul. 13, 2018

(51) Int. Cl.
*G06F 13/16* (2006.01)
*H04L 29/08* (2006.01)
*G06F 13/40* (2006.01)

(52) U.S. Cl.
CPC ...... *G06F 13/1668* (2013.01); *G06F 13/4072* (2013.01); *H04L 67/1097* (2013.01)

(58) Field of Classification Search
CPC ............. G06F 13/1668; G06F 13/4072; H04L 67/1097
See application file for complete search history.

(56) References Cited

U.S. PATENT DOCUMENTS

| 6,687,746 | B1  | 2/2004  | Shuster et al. |
| 6,697,875 | B1  | 2/2004  | Wilson |
| 7,454,437 | B1  | 11/2008 | Lavallee et al. |
| 7,818,428 | B1  | 10/2010 | Lavallee et al. |
| 7,925,872 | B2  | 4/2011  | Lai et al. |
| 8,479,304 | B1* | 7/2013  | Clifford ............. H04L 63/0428 707/692 |
| 9,594,780 | B1  | 3/2017  | Esposito et al. |
| 9,778,852 | B1  | 10/2017 | Marshak et al. |
| 10,324,656 | B1* | 6/2019  | Zhao ..................... G06F 3/0605 |
| 2004/0010563 | A1 | 1/2004 | Forte et al. |

(Continued)

OTHER PUBLICATIONS

Vmware, "Multipathing Configuration for Software iSCSI Using Port Binding," Technical White Paper, Apr. 25, 2012, 15 pages.

(Continued)

*Primary Examiner* — Idriss N Alrobaye
*Assistant Examiner* — Ronald T Modo
(74) *Attorney, Agent, or Firm* — Ryan, Mason & Lewis, LLP

(57) ABSTRACT

An apparatus in one embodiment comprises a host device configured to communicate over a network with a storage system comprising a plurality of storage devices. The host device comprises a set of input-output queues and a multi-path input-output driver configured to select input-output operations from the set of input-output queues for delivery to the storage system over the network. The multi-path input-output driver is further configured to determine data reduction control indicators for the input-output operations, and to provide the data reduction control indicators to the storage system in association with the input-output operations. Different data reduction control indicators are associated with different ones of the input-output operations that are generated by different processes running on the host device. The storage system adapts its performance of data reduction for the different ones of the input-output operations based at least in part on their associated data reduction control indicators.

20 Claims, 4 Drawing Sheets

(56) References Cited

U.S. PATENT DOCUMENTS

| | | |
|---|---|---|
| 2008/0043973 A1 | 2/2008 | Lai et al. |
| 2011/0197027 A1 | 8/2011 | Balasubramanian et al. |
| 2016/0117113 A1 | 4/2016 | Li et al. |
| 2019/0013087 A1* | 1/2019 | Mahajan ................ G16H 50/20 |

OTHER PUBLICATIONS

Dell EMC, "Dell EMC SC Series Storage: Microsoft Multipath I/O," Dell EMC Engineering, Jun. 2017, 56 pages.
Dell EMC, "Dell EMC PowerPath Family: PowerPath and PowerPath/VE Multipathing," Data Sheet, 2017, 3 pages.
U.S. Appl. No. 15/795,653 filed in the name of Maneesh Pusalkar et al. filed Oct. 27, 2017 and entitled "Storage System with Network-Wide Configurable Device Names."
U.S. Appl. No. 15/849,828 filed in the name of Sanjib Mallick et al. filed Dec. 21, 2017 and entitled "Storage System with Input-Output Performance Control Utilizing Application Process Detection."
NVM Express, "NVMe Specification," Revision 1.3, May 1, 2017, 282 pages.

\* cited by examiner

HOST APPLICATION TABLE 400

| APPLICATION NAME | PROCESSES IN APPLICATION | CONDITIONS |
|---|---|---|
| APPLICATION NAME | PROCESSES IN APPLICATION | CONDITIONS |
| ... | | ... |
| APPLICATION NAME | PROCESSES IN APPLICATION | CONDITIONS |

FIG. 4

HOST DEVICE WITH MULTI-PATH LAYER CONFIGURED FOR PER-PROCESS DATA REDUCTION CONTROL

FIELD

The field relates generally to information processing systems, and more particularly to storage in information processing systems.

BACKGROUND

Storage arrays and other types of storage systems are often shared by multiple host devices over a network. However, problems can arise in such arrangements in that some storage systems are configured to differentiate performance of data reduction such as compression or deduplication only on the basis of a storage device or a group of storage devices. A given such storage device may comprise a logical storage device such as a particular logical storage volume. Compression or deduplication functionality generally must be activated or deactivated for the entire logical storage volume. Even if that functionality is activated for a given logical storage volume, the storage system will typically perform tests on that volume in order to confirm its data reduction potential before actually performing the compression or deduplication. A user desiring different types of data reduction for different processes of an application running on a host device may have to designate separate storage devices or groups of storage devices within the storage system for handling input-output (IO) operations of each of the different processes of the application. Another possible approach is for the host device to provide out-of-band hints indicating particular storage device extents that are used by the different processes, but such an approach is unduly complex and can adversely impact IO performance. For example, the storage device extents used by the different processes can dynamically change over time and therefore must be carefully managed on both the host devices and the storage array.

SUMMARY

Illustrative embodiments configure a multi-path layer of one or more host devices to include functionality for controlling the performance of data reduction such as compression or deduplication on a per-process basis in an associated storage array or other type of storage system. The multi-path layer illustratively comprises at least one multi-path input-output (MPIO) driver configured to process IO operations of at least one host device. The multi-path layer in such arrangements can be configured to specify for each of a plurality of processes executing on the host device whether or not the data associated with the corresponding IO operations should be subject to data reduction.

These embodiments provide fine-grained control in performance of data reduction within a storage system, thereby overcoming the problems that might otherwise result when utilizing storage systems that differentiate application of data reduction only on the basis of a storage device or a group of storage devices. For example, some embodiments can alter the performance of data reduction for IO operations of different processes of an application running on a given host device even when the IO operations of the different processes are all directed to the same storage device or group of devices within a storage array.

Such arrangements can avoid the need for a user to designate separate storage devices or groups of storage devices within a storage system for handling IO operations of each of the different processes of the application, while also avoiding the complexities and potential performance impacts of the above-noted out-of-band hinting approach.

Moreover, these arrangements can avoid the need for the storage system to perform compression or deduplication tests on a given logical storage volume or other storage device associated with one or more IO operations in order to determine its data reduction potential before deciding whether or not to apply data reduction to that logical storage volume or other storage device. As a result of an at least partial elimination of such tests, storage system performance is significantly improved.

In one embodiment, an apparatus comprises a host device configured to communicate over a network with a storage system comprising a plurality of storage devices. The host device includes a set of IO queues and an MPIO driver configured to select IO operations from the set of IO queues for delivery to the storage system over the network. The MPIO driver is further configured to determine data reduction control indicators for the IO operations, and to provide the data reduction control indicators to the storage system in association with the IO operations. Different data reduction control indicators are associated with different ones of the IO operations that are generated by different processes running on the host device. The storage system adapts its performance of data reduction for the different ones of the IO operations based at least in part on their associated data reduction control indicators.

A given one of the data reduction control indicators in some embodiments comprises at least one of a compression control indicator and a deduplication control indicator for at least one of the IO operations. Additional or alternative data reduction control indicators can be used in other embodiments.

As another illustrative example, a given one of the data reduction control indicators may comprise a binary indicator specifying whether or not data reduction is to be applied by the storage system for at least one of the IO operations that is associated with the given data reduction control indicator.

In some embodiments, determining data reduction control indicators for respective ones of the IO operations comprises identifying a process that generated at least one of the IO operations, and determining the data reduction control indicator for the process from a corresponding entry of a process table stored in a persistent memory of the host device.

For example, the data reduction control indicator may comprise a compression control indicator stored in a compression field of the corresponding entry of the process table, and/or a deduplication control indicator stored in a deduplication field of the corresponding entry of the process table.

The process table in some embodiments comprises a user-editable table that is automatically populated utilizing an application table comprising a plurality of entries for respective applications running on the host device with each such entry identifying one or more processes of the corresponding application.

In some embodiments, providing the data reduction control indicators to the storage system in association with the IO operations comprises configuring a process tag of a first one of the IO operations generated by a first process to include a first data reduction control indicator of a first type, configuring a process tag of a second one of the IO operations generated by a second process to include a second data reduction control indicator of a second type, and providing the first and second IO operations and their respective process tags to the storage system.

As one example, the first and second processes in an illustrative embodiment comprise respective log and database processes of a database application, with IO operations generated by the log process of the database application having a data reduction control indicator specifying that data reduction should not be applied for those IO operations by the storage system, and IO operations generated by the database process of the database application having a data reduction control indicator specifying that data reduction should be applied for those IO operations by the storage system.

Other techniques can be used in other embodiments in order to provide the data reduction control indicators to the storage system in respective process tags assigned to respective ones of the IO operations by the MPIO driver.

In some embodiments, providing the data reduction control indicators to the storage system in association with the IO operations comprises providing at least portions of the above-described process table to the storage system for storage in a persistent memory of the storage system.

These and other illustrative embodiments include, without limitation, apparatus, systems, methods and computer program products comprising processor-readable storage media.

BRIEF DESCRIPTION OF THE DRAWINGS

FIG. 4 shows an example of a host application table that may be utilized to automatically populate the host process table of FIG. 3 in an illustrative embodiment.

DETAILED DESCRIPTION

Illustrative embodiments will be described herein with reference to exemplary information processing systems and associated computers, servers, storage devices and other processing devices. It is to be appreciated, however, that embodiments of the present disclosure are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center that includes one or more clouds hosting multiple tenants that share cloud resources. Numerous other types of enterprise and cloud-based computing and storage systems are also encompassed by the term "information processing system" as that term is broadly used herein.

Figure 1:
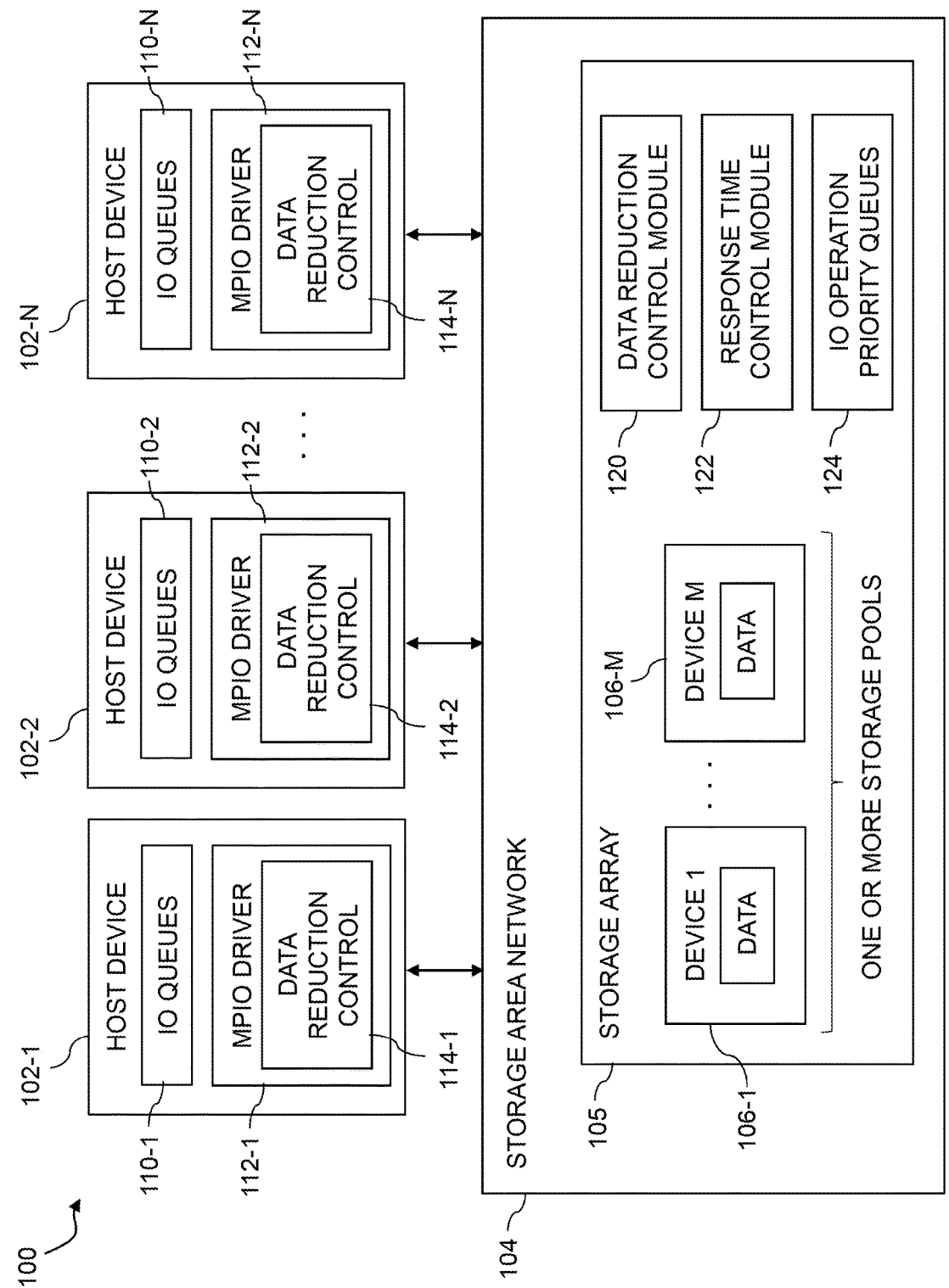
FIG. 1 is a block diagram of an information processing system configured with functionality for per-process data reduction control utilizing a multi-path layer of a host device in an illustrative embodiment.

FIG. 1 shows an information processing system 100 configured in accordance with an illustrative embodiment. The information processing system 100 comprises a plurality of host devices 102-1, 102-2, . . . 102-N. The host devices 102 communicate over a storage area network (SAN) 104 with at least one storage array 105. The storage array 105 comprises a plurality of storage devices 106-1, . . . 106-M each storing data utilized by one or more applications running on one or more of the host devices 102. The storage devices 106 are illustratively arranged in one or more storage pools. The storage array 105 and its associated storage devices 106 are an example of what is more generally referred to herein as a "storage system." This storage system in the present embodiment is shared by the host devices 102, and is therefore also referred to herein as a "shared storage system."

The host devices 102 illustratively comprise respective computers, servers or other types of processing devices capable of communicating with the storage array 105 of the SAN 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102. The term "user" herein is intended to be broadly construed so as to encompass numerous arrangements of human, hardware, software or firmware entities, as well as combinations of such entities. Compute services may be provided for users under a platform-as-a-service (PaaS) model, although it is to be appreciated that numerous other cloud infrastructure arrangements could be used.

The storage devices 106 of the storage array 105 of SAN 104 implement logical units (LUNs) configured to store objects for users associated with the host devices 102. These objects can comprise files, blocks or other types of objects. The host devices 102 interact with the storage array 105 utilizing read and write commands as well as other types of commands that are transmitted over the SAN 104. Such commands in some embodiments more particularly comprise Small Computer System Interface (SCSI) commands, although other types of commands can be used in other embodiments. A given IO operation as that term is broadly used herein illustratively comprises one or more such commands. References herein to terms such as "input-output" and "IO" should be understood to refer to input and/or output. Thus, an IO operation relates to at least one of input and output.

Also, the term "storage device" as used herein is intended to be broadly construed, so as to encompass, for example, a logical storage device such as a LUN or other logical storage volume. A logical storage device can be defined in the storage array 105 to include different portions of one or more physical storage devices. Storage devices 106 may therefore be viewed as comprising respective LUNs or other logical storage volumes.

Each of the host devices 102 illustratively has multiple paths to the storage array 105, with at least one of the storage devices 106 of the storage array 105 being visible to that host device on a given one of the paths. A given one of the storage devices 106 may be accessible to the given host device over multiple paths.

Different ones of the storage devices 106 of the storage array 105 illustratively exhibit different latencies in processing of IO operations. In some cases, the same storage device may exhibit different latencies for different ones of multiple paths over which that storage device can be accessed from a given one of the host devices 102.

The host devices 102, SAN 104 and storage array 105 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102 and the storage array 105 may be implemented on respective distinct processing platforms, although numerous other arrangements are possible. For example, in some embodiments at least portions of the host devices 102 and the storage array 105 are implemented on the same processing platform. The storage array 105 can therefore be implemented at least in part within at least one processing platform that implements at least a subset of the host devices 102.

The SAN 104 may be implemented using multiple networks of different types to interconnect storage system components. For example, the SAN 104 may comprise a portion of a global computer network such as the Internet, although other types of networks can be part of the SAN 104, including a wide area network (WAN), a local area network (LAN), a satellite network, a telephone or cable network, a cellular network, a wireless network such as a WiFi or WiMAX network, or various portions or combinations of these and other types of networks. The SAN 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The host devices 102 comprise respective sets of IO queues 110-1, 110-2, . . . 110-N and respective MPIO drivers 112-1, 112-2, . . . 112-N. The MPIO drivers 112 collectively comprise a multi-path layer of the host devices 102. The multi-path layer provides functionality for per-process data reduction control using respective data reduction control modules 114-1, 114-2, . . . 114-N implemented within the MPIO drivers 112.

The MPIO drivers 112 may comprise, for example, otherwise conventional MPIO drivers, such as PowerPath drivers from Dell EMC, suitably modified in the manner disclosed herein to provide per-process data reduction control. Other types of MPIO drivers from other driver vendors may be suitably modified to incorporate functionality for per-process data reduction control as disclosed herein.

The multi-path layer comprising MPIO drivers 112 supports multiple paths between each of the host devices 102 and the storage array 105. These paths are illustratively associated with respective initiator-target pairs, with each initiator comprising a host bus adaptor (HBA) or other initiating entity of a given host device such as the host device 102-1 and each target comprising a port or other targeted entity corresponding to one or more of the storage devices 106 of the storage array 105. As noted above, the storage devices 106 illustratively comprise LUNs or other types of logical storage devices.

Paths may be added or deleted between the host devices 102 and the storage array 105 in the system 100. For example, the addition of one or more new paths from host device 102-1 to the storage array 105 or the deletion of one or more existing paths from the host device 102-1 to the storage array 105 may result from respective addition or deletion of at least a portion of the storage devices 106 of the storage array 105. Addition or deletion of paths can also occur as a result of zoning and masking changes or other types of storage system reconfigurations performed by a storage administrator or other user.

In some embodiments, paths are added or deleted in conjunction with addition of a new storage array or deletion of an existing storage array from a storage system that includes multiple storage arrays, possibly in conjunction with configuration of the storage system for at least one of a migration operation and a replication operation.

For example, a storage system may include first and second storage arrays, with data being migrated from the first storage array to the second storage array prior to removing the first storage array from the storage system.

As another example, a storage system may include a production storage array and a recovery storage array, with data being replicated from the production storage array to the recovery storage array so as to be available for data recovery in the event of a failure involving the production storage array.

In these and other situations, path discovery scans may be performed by the MPIO drivers 112 of the multi-path layer as needed in order to discover the addition of new paths or the deletion of existing paths.

A given path discovery scan can be performed utilizing known functionality of conventional MPIO drivers, such as PowerPath drivers.

The path discovery scan in some embodiments may be further configured to identify one or more new LUNs or other logical storage volumes associated with the one or more new paths identified in the path discovery scan. The path discovery scan may comprise, for example, one or more bus scans which are configured to discover the appearance of any new LUNs that have been added to the storage array 105 as well to discover the disappearance of any existing LUNs that have been deleted from the storage array 105.

For each of one or more new paths identified in a path discovery scan of the type described above, the corresponding one of the host devices 102 is configured to execute a host registration operation for that path. The host registration operation for a given new path illustratively provides notification to the storage array 105 that the corresponding one of the host devices 102 has discovered the new path.

The MPIO drivers 112 utilize the multiple paths described above to send IO operations from the host devices 102 to the storage array 105.

For example, the MPIO driver 112-1 is configured to select IO operations from its corresponding set of IO queues 110-1 for delivery to the storage array 105 over the SAN 104. The sources of the IO operations stored in the set of IO queues 110-1 illustratively include respective processes of one or more applications executing on the host device 102-1. Other types of sources of IO operations may be present in a given implementation of system 100.

The MPIO driver 112-1 is further configured to determine data reduction control indicators for the IO operations, and to provide the data reduction control indicators to the storage array 105 in association with the IO operations. Different data reduction control indicators are associated with different ones of the IO operations that are generated by different processes running on the host device 102-1. The different data reduction control indicators associated with the different ones of the IO operations are configured to permit the storage array 105 to adapt its performance of data reduction for the different ones of the IO operations based at least in part on their associated data reduction control indicators.

A given one of the data reduction control indicators illustratively comprises at least one of a compression control indicator and a deduplication control indicator for at least one of the IO operations.

The given data reduction control indicator in some embodiments comprises a binary indicator specifying whether or not data reduction is to be applied by the storage array 105 for at least one of the IO operations that is associated with the given data reduction control indicator. For example, a binary compression control indicator can be used to specify whether or not compression is to be applied for the corresponding IO operation, and a binary deduplication control indicator can be used to specify whether or not deduplication is to be applied for the corresponding IO operation.

A wide variety of other types of data reduction control indicators can be used in other embodiments.

In some embodiments, determining data reduction control indicators for respective ones of the IO operations comprises identifying a process that generated at least one of the IO operations, and determining the data reduction control indicator for the process from a corresponding entry of a process table stored in a persistent memory of the host device.

One possible example of a process table of this type will be described in more detail below in conjunction with FIG. 3.

The data reduction control indicator for the process is illustratively associated with all of the IO operations generated by that process. This is an example of a per-process data reduction control arrangement which associates a common data reduction control indicator with all of the IO operations generated by a given process.

The data reduction control indicator in the present embodiment comprises at least one of a compression control indicator stored in a compression field of the corresponding entry of the process table and a deduplication control indicator stored in a deduplication field of the corresponding entry of the process table.

The process table illustratively comprises a user-editable table that is automatically populated utilizing an application table comprising a plurality of entries for respective applications running on the host device 102-1 with each such entry identifying one or more processes of the corresponding application.

A host administrator or other system user can therefore edit the process table after it is automatically populated using the application table, for example, in order to override particular automated data reduction options. For example, an Oracle redo log ("ReLog") process may be automatically configured in the process table with a data reduction control indicator that indicates that data reduction is OFF for that process, although a system user with appropriate authorization could alter the data reduction control indicator. Binary indicator values such as ON/OFF or YES/NO may be used in the process table.

In some embodiments, the MPIO driver 112-1 is configured to compose the application table utilizing the process names of the processes running in the host device 102-1. Such process names often include application names. A host administrator or other system user can also edit the application table, in some cases to indicate data reduction treatment per application instance. For example, an Oracle marketing application could be specified in the application table as data reduction OFF, while an Oracle sales application could be specified in the application as data reduction ON. Such application instance conditions are translated to per-process data reduction indicators in the process table.

Numerous alternative process table and application table configurations and formats can be used in other embodiments.

In some embodiments, providing the data reduction control indicators to the storage array 105 in association with the IO operations illustratively comprises configuring a process tag of a first one of the IO operations generated by a first process to include a first data reduction control indicator of a first type, configuring a process tag of a second one of the IO operations generated by a second process to include a second data reduction control indicator of a second type, and providing the first and second IO operations and their respective process tags to the storage array 105.

This is an example of an arrangement in which process tags are associated with respective ones of the IO operations and utilized to convey the respective corresponding data reduction control indicators to the storage array 105. Each process tag illustratively includes one or more fields configured to carry at least one data reduction control indicator from the host device 102-1 to the storage array 105.

A more detailed example of an arrangement of this type is described below in conjunction with the embodiment of FIG. 2.

In some embodiments, configuring a process tag of a given one of the IO operations to include a given one of the data reduction control indicators comprises combining the given data reduction control indicator with a base portion of the process tag wherein the base portion indicates a particular one of a plurality of different priority levels for processing of a corresponding IO operation in the storage array 105.

Arrangements of the type described above advantageously allow application of data reduction by the storage array 105 to be adapted on a per-process basis. For example, the first and second processes referred to above in some embodiments comprise respective log and database processes of a database application, where it is desirable to provide data reduction in the storage array 105 for IO operations generated by the database process but not for IO operations generated by the log process. In this example, the IO operations generated by the log process of the database application are each associated with a data reduction control indicator specifying that data reduction should not be applied for those IO operations by the storage array 105 and IO operations generated by the database process of the database application are each associated with a data reduction control indicator specifying that data reduction should be applied for those IO operations by the storage array 105.

These and other embodiments are examples of arrangements in which the data reduction control indicators are provided to the storage array 105 in respective process tags assigned to respective ones of the IO operations by the MPIO driver 112-1. Other embodiments can utilize different arrangements to provide the data reduction control indicators to the storage array 105 in association with the IO operations.

In some embodiments, providing the data reduction control indicators to the storage array 105 in association with the IO operations additionally or alternatively comprises providing at least portions of the above-described process table to the storage array 105 for storage in a persistent memory of the storage array 105.

The process tags are illustratively assigned to the respective IO operations by the MPIO drivers 112-1 of the host devices 102-1. For example, the process tags may be assigned to the respective IO operations in a kernel-space portion of the MPIO driver 112-1 of the host device 102-1. Alternatively, assignment of process tags to respective IO operations may occur solely in a user-space portion of the MPIO driver, or using cooperative interaction between the user-space and kernel-space portions of the MPIO driver, instead of solely in the kernel-space portion of the MPIO driver.

As noted above, the IO operations each illustratively comprise one or more SCSI commands. These and other commands of a given IO operation in some embodiments are suitably modified to incorporate a corresponding assigned process tag. The commands utilized in a given embodiment can include commands that are part of a standard command set or may include custom commands such as a "vendor unique command" or VU command that is not part of a standard command set.

For example, in some embodiments, the process tags are assigned to respective ones of the IO operations by incorporating the process tags into respective command descriptor blocks of corresponding commands directed from the host device 102-1 to the storage array 105. More particularly, a given one of the process tags for one of the IO operations may be incorporated into a group number field of the command descriptor block of the corresponding command.

Additionally or alternatively, the process tag may be incorporated into a VU field of the command descriptor block of the corresponding command. Numerous other arrangements are possible. For example, different portions of a given process tag for one of the IO operations can be inserted into respective different commands in an arrangement in which the IO operation comprises multiple commands.

The above-described functions associated with per-process data reduction control functionality of the MPIO driver 112-1 are carried out at least in part under the control of its data reduction control module 114-1. For example, the data reduction control module 114-1 is illustratively configured to control performance of portions of the process shown in the flow diagram to be described below in conjunction with FIG. 2.

It is assumed that each of the other MPIO drivers 112 is configured in a manner similar to that described above and elsewhere herein for the first MPIO driver 112-1. The other host devices 102 of the system 100 are therefore also configured to communicate over the SAN 104 with the storage array 105 and the MPIO drivers 112 of such other host devices are each similarly configured to select IO operations from its corresponding one of the sets of IO queues 110 for delivery to the storage array 105 over the SAN 104, and to perform the disclosed functionality for per-process data reduction control. Accordingly, functionality described above in the context of the first MPIO driver 112-1 is assumed to be similarly performed by each of the other MPIO drivers 112-2 through 112-N.

The MPIO drivers 112 may be otherwise configured utilizing well-known MPIO functionality such as that described in K. Piepho, "Dell EMC SC Series Storage: Microsoft Multipath I/O," Dell EMC Engineering, June 2017, which is incorporated by reference herein. Such conventional MPIO functionality is suitably modified in illustrative embodiments disclosed herein to support per-process data reduction control.

Although in some embodiments certain commands used by the host devices 102 to communicate with the storage array 105 illustratively comprise SCSI commands, other types of commands and command formats can be used in other embodiments. For example, some embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF.

As indicated previously, absent use of per-process data reduction control techniques as disclosed herein, many storage systems are constrained to differentiating performance of data reduction such as compression or deduplication only on the basis of a storage device or a group of storage devices, and will typically perform tests on the storage device or group of storage devices in order to confirm its data reduction potential before actually performing the compression or deduplication. This leads to inefficiencies in the storage system as well as in the host devices that share that storage system.

Such drawbacks are advantageously overcome in illustrative embodiments herein by utilization of a multi-path layer comprising one or more of the MPIO drivers 112 to implement per-process data reduction control as described above.

The storage array 105 in the present embodiment is assumed to comprise a persistent memory that is implemented using a flash memory or other type of non-volatile memory of the storage array 105. More particular examples include NAND-based flash memory or other types of non-volatile memory such as resistive RAM, phase change memory, spin torque transfer magneto-resistive RAM (STT-MRAM) and Intel Optane™ devices based on 3D XPoint™ memory. The persistent memory is further assumed to be separate from the storage devices 106 of the storage array 105, although in other embodiments the persistent memory may be implemented as a designated portion or portions of one or more of the storage devices 106. For example, in some embodiments the storage devices 106 may comprise flash-based storage devices, as in embodiments involving all-flash storage arrays.

The persistent memory of the storage array 105 in some embodiments is utilized to store at least portions of the above-described process table, which may be provided to the storage array 105 from the host device 102-1 for use in supporting per-process data reduction control functionality of system 100.

The storage array 105 in the present embodiment further comprises additional components including a data reduction control module 120, a response time control module 122 and IO operation priority queues 124, illustratively configured to make use of the above-described persistent memory.

The data reduction control module 120 is configured to adapt performance of data reduction in the storage array 105 for different IO operations based at least in part on their associated data reduction control indicators. In performing this function, the data reduction control module 120 illustratively makes use of the above-described process table at least portions of which are stored in the persistent memory of the storage array 105.

The response time control module 122 is illustratively utilized to implement storage array based adjustments in response time for particular IO operations based at least in part on service level objective (SLO) information stored by the storage array 105 in its persistent memory. The response time control module 122 operates in conjunction with the IO operation priority queues 124.

The storage array 105 utilizes its IO operation priority queues 124 to provide different levels of performance for IO operations. For example, the IO operation priority queues 124 may have respective different priority levels. The storage array 105 may be configured to provide different priority levels for different ones of the IO operations by assigning different ones of the IO operations to different ones of the IO operation priority queues 124. The IO operation priority queues 124 are illustratively associated with respective SLOs for processing of IO operations in the storage array 105.

Process tags may be used in assigning different ones of the IO operations to different ones of the IO operation priority queues 124, as disclosed in U.S. patent application Ser. No. 15/849,828, filed Dec. 21, 2017 and entitled "Storage System with Input-Output Performance Control Utilizing Application Process Detection," which is incorporated by reference herein.

As mentioned above, communications between the host devices 102 and the storage array 105 may utilize PCIe connections or other types of connections implemented over one or more networks. For example, illustrative embodiments can use interfaces such as Serial Attached SCSI (SAS) and Serial ATA (SATA). Numerous other interfaces and associated communication protocols can be used in other embodiments.

The storage array 105 in some embodiments may be implemented as part of cloud infrastructure in the form of a cloud-based system such as an Amazon Web Services (AWS) system. Other examples of cloud-based systems that can be used to provide at least portions of the storage array 105 and possibly other portions of system 100 include Google Cloud Platform (GCP) and Microsoft Azure.

The storage array 105 may additionally or alternatively be configured to implement multiple distinct storage tiers of a multi-tier storage system. By way of example, a given multi-tier storage system may comprise a fast tier or performance tier implemented using flash storage devices, and a capacity tier implemented using hard disk drive devices. A wide variety of other types of server-based flash storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, disk drives, flash drives, solid-state drives, hybrid drives or other types of storage products and devices, or portions thereof, and illustratively include logical storage devices such as LUNs.

As another example, the storage array 105 may be used to implement one or more storage nodes in a cluster storage system comprising a plurality of storage nodes interconnected by one or more networks.

It should therefore be apparent that the term "storage array" as used herein is intended to be broadly construed, and may encompass multiple distinct instances of a commercially-available storage array suitably reconfigured to support per-process data reduction control through interaction with a multi-path layer as disclosed herein.

For example, the storage array 105 may comprise one or more storage arrays such as VNX®, Symmetrix VMAX® and Unity™ storage arrays, commercially available from Dell EMC. Other types of storage products that can be used in implementing a given storage system in illustrative embodiments include software-defined storage products such as ScaleIO™, cloud storage products such as Elastic Cloud Storage (ECS), object-based storage products such as Atmos, scale-out all-flash storage arrays such as XtremIO™, and scale-out NAS clusters comprising Isilon® platform nodes and associated accelerators, all from Dell EMC. Combinations of multiple ones of these and other storage products can also be used in implementing a given storage system in an illustrative embodiment.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. Thus, it is possible in some implementations of the system 100 for different ones of the host devices 102 to reside in different data centers than the storage array 105.

Numerous other distributed implementations of the host devices 102 and/or the storage array 105 are possible. Accordingly, the storage array 105 can also be implemented in a distributed manner across multiple data centers.

It is to be appreciated that these and other features of illustrative embodiments are presented by way of example only, and should not be construed as limiting in any way. Accordingly, different numbers, types and arrangements of system components such as host devices 102, SAN 104, storage array 105, storage devices 106, sets of IO queues 110, MPIO drivers 112 and data reduction control modules 114 can be used in other embodiments.

It should also be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

The operation of the information processing system 100 will now be described in further detail with reference to the flow diagram of the illustrative embodiment of FIG. 2. The process as shown includes steps 200 through 208, and is suitable for use in the system 100 but is more generally applicable to other types of systems comprising multiple host devices and a shared storage system. The shared storage system in this embodiment is assumed to comprise at least one storage array having a plurality of storage devices. Steps 200 and 202 in the present embodiment are illustratively performed primarily by a given host device, and steps 204 through 208 are performed primarily by the storage array, although other arrangements of system components can perform at least portions of one or more of the steps in other embodiments. This embodiment further assumes that the commands utilized by the host devices in generating IO operations such as read and write operations directed to the storage array comprise SCSI commands, although other types of commands can be used.

In step 200, an MPIO driver of a given host device assigns a process tag comprising a particular data reduction control indicator to an IO operation.

A given one of the data reduction control indicators illustratively comprises at least one of a compression control indicator and a deduplication control indicator for at least one of the input-output operations. For example, the compression control indicator and the deduplication control indicator may comprise respective binary indicators that respectively specify whether or not compression or deduplication should be applied by the storage array for the corresponding IO operation. Such application of compression or deduplication in dependence upon the data reduction indicator illustratively includes application of compression or deduplication to at least a portion of a storage device or group of storage devices that is the designated target of the IO operation.

The process tag can include the data reduction control indicator as well as other information. An example of an arrangement of this type is shown in FIG. 3. In this example, a host process table 300 comprises a plurality of entries for respective processes executing on a host device. Each of the entries includes a process name, a process tag and multiple behavioral fields that include compression and deduplication fields for that process, as well as one or more other fields. The host process table 300 is illustratively stored in a persistent memory of the given host device.

The compression field of a given entry of the host process table 300 stores a compression control indicator for the corresponding process. Similarly, the deduplication field of the given entry of the host process table 300 stores a deduplication control indicator for the corresponding process.

The one or more other fields can store additional indicators for the corresponding process, such as a replication indicator specifying whether or not replication should be performed for IO operations of the corresponding process, a backup indicator specifying whether or not backup copies should be generated for IO operations of the corresponding process, and a snapshot indicator specifying whether or not snapshots should be generated for IO operations of the corresponding process.

It is assumed in this example that the compression control indicator is the same for all of the IO operations generated by that process. Similarly, the deduplication control indicator, and any additional indicators in the other fields of the entry for the corresponding process, is the same for all of the IO operations generated by that process.

Figure 3:
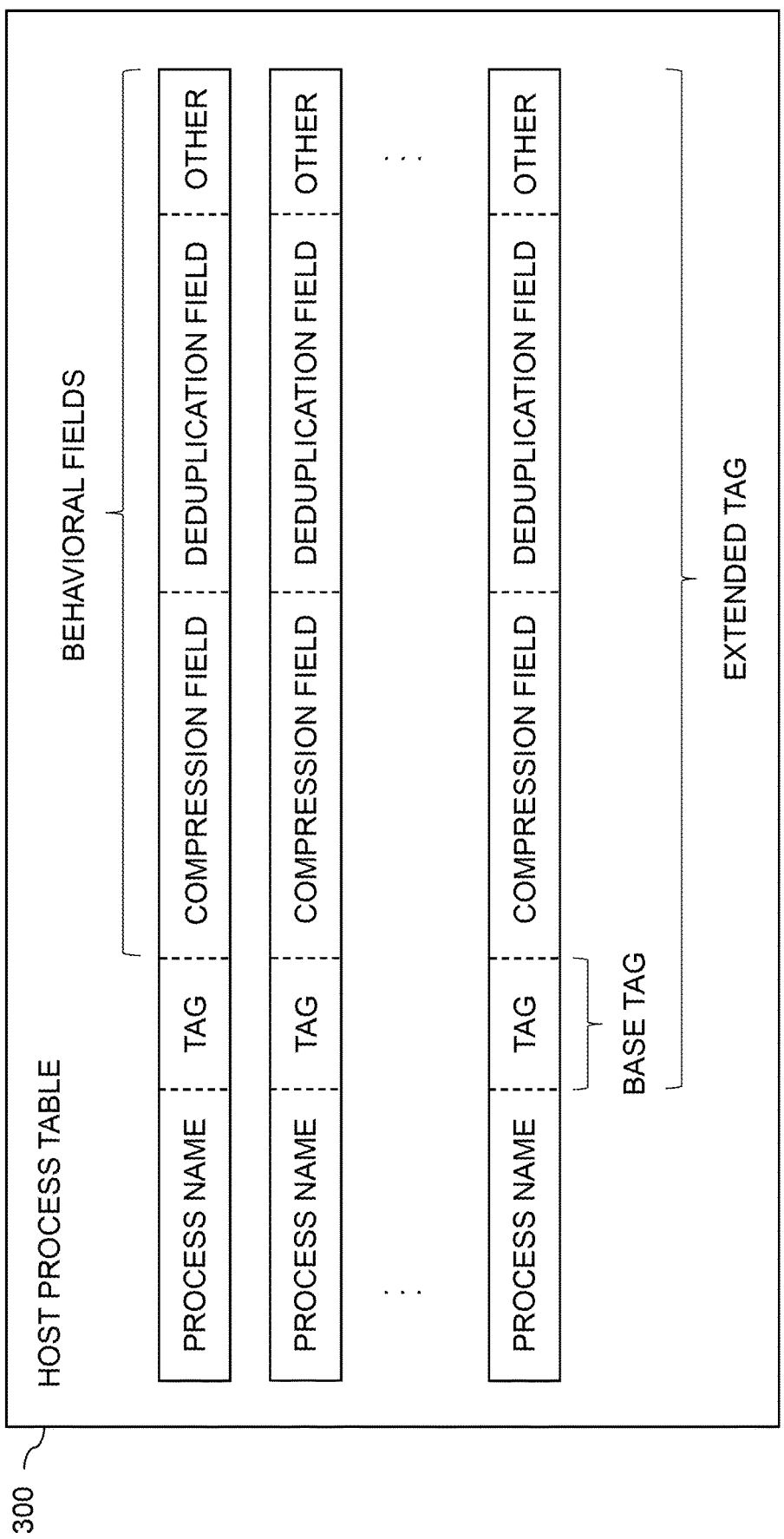
FIG. 3 shows an example of a host process table having entries for respective processes executing on a host device in an illustrative embodiment with each entry including a process name, a process tag and multiple behavioral fields that include compression and deduplication fields for that process.

In the example of FIG. 3, the process tag in a given entry of the host process table illustratively comprises a base tag that is expanded to include the behavioral fields. The resulting expanded tag is also referred to as a "process tag" as that term is intended to be broadly construed herein. Accordingly, in some embodiments, configuring a process tag of a given one of the IO operations to include a given one of the data reduction control indicators comprises combining the given data reduction control indicator with a base portion of the process tag. The base tag may be used for other purposes, such as to indicate a particular one of a plurality of different priority levels for processing of a corresponding IO operation in the storage array.

A wide variety of alternative process tag configurations and formats may be used. The particular fields of the host process table 300 and their arrangement as shown in the figure are therefore presented by way of illustrative example only, and should not be construed as limiting in any way.

As one additional example, the data reduction control indicator associated with a given IO operation in some embodiments comprises the entirety of the process tag assigned to that IO operation. The term "data reduction control indicator" as used herein is therefore intended to be broadly construed so as to encompass, for example, an entire process tag of the type described herein, rather than a portion of a process tag.

As is apparent from the above, determining data reduction control indicators for respective IO operations in some embodiments illustratively comprises identifying a process that generated at least one of the IO operations, and determining the data reduction control indicator for the process from a corresponding entry of the host process table 300 stored in a persistent memory of the host device.

At least a portion of the host process table 300 in some embodiments is also provided to the storage array for storage in its persistent memory. The storage array can utilize the transferred table or portions thereof in its data reduction control module to adapt its performance of data reduction for different IO operations based at least in part on their associated data reduction control indicators.

In some embodiments, the process table 300 comprises a user-editable table that is automatically populated utilizing an application table comprising a plurality of entries for respective applications running on the host device with each such entry identifying one or more processes of the corresponding application.

An example of an application table of this type is shown in FIG. 4, which shows a host application table 400 that may be utilized to automatically populate the host process table 300 of FIG. 3 in an illustrative embodiment. The host application table 400 comprises a plurality of entries for respective applications executing on a host device. Each of the entries includes an application name, process names for respective processes that are part of that application, and one or more conditions that illustratively characterize utilization of the entry in populating a host process table. For example, the conditions may specify that certain types of data reduction are to be applied for one or more of the processes of the application but not for one or more other processes of the application. The host application table 400 is also assumed to be stored in a persistent memory of the given host device.

As indicated previously, the assignment of the process tag to the IO operation may occur in a kernel-space portion of the MPIO driver of the given host device, although other process tag assignment arrangements are possible.

In some embodiments, process tags are assigned to respective IO operations by incorporating the process tags into respective command descriptor blocks of corresponding commands directed from the given host device to the storage array. For example, a given one of the process tags may be incorporated at least in part into a group number field of the command descriptor block of the corresponding command. Additionally or alternatively, the given process tag can be incorporated at least in part into a VU field of the command descriptor block of the corresponding command. It is therefore possible in some embodiments that different portions of the given process tag can be incorporated into different parts of a command descriptor block, or in one or more other parts of a corresponding command. The term "process tag" as used herein is therefore intended to be broadly construed and in some embodiments may be distributed across multiple distinct command fields of a particular IO operation. The corresponding commands illustratively comprise respective SCSI commands.

Again, these particular command format features are examples only, and numerous other SCSI or non-SCSI command formats may be used in other embodiments, including VU commands or other user-defined commands.

Figure 2:
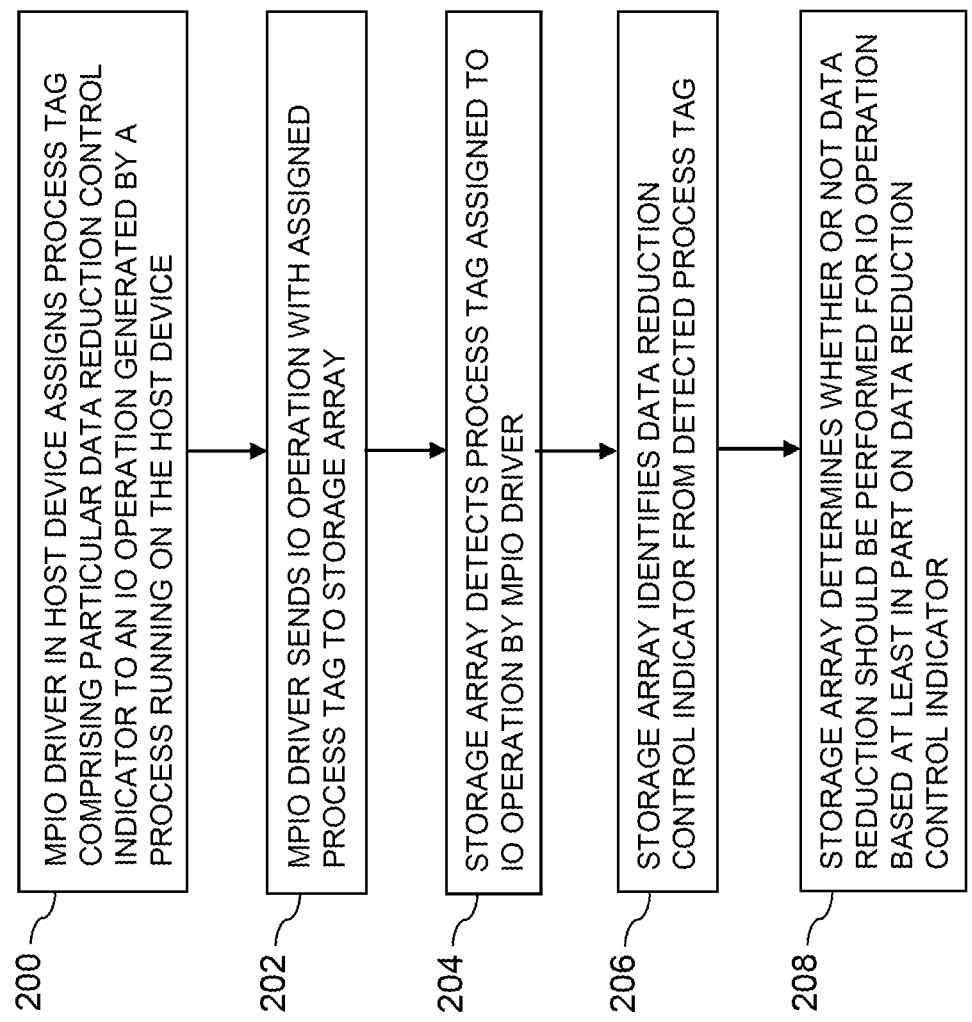
FIG. 2 is a flow diagram of a process for per-process data reduction control utilizing a multi-path layer of a host device in an illustrative embodiment.

The description of the steps of the FIG. 2 flow diagram will now resume.

In step 202, the MPIO driver sends the IO operation with its assigned process tag to the storage array. The storage array is illustratively configured under processor control to comprise a plurality of storage devices and to communicate over one or more networks with the given host device and one or more other host devices.

In step 204, the storage array detects the process tag assigned to the IO operation by the MPIO driver.

In step 206, the storage array identifies the data reduction control indicator from the detected process tag. As noted above, the data reduction control indicator in some cases comprises one or more designated portions of the process tag. Alternatively, the data reduction control indicator can comprise the process tag itself.

In step 208, the storage array determines whether or not data reduction should be performed for the IO operation based at least in part on the data reduction control indicator identified in step 206. This illustratively involves determining whether or not data reduction should be applied to data associated with the IO operation.

For example, in some implementations of the FIG. 2 process, the process tags assigned to respective IO operations by the given host device in different instances of step 200 of the process are of at least first and second distinct types so as to distinguish at least respective first and second distinct processes generating corresponding ones of the IO operations on the given host device. Responsive to a particular one of the detected process tags being of the first type, the storage array provides a first type of data reduction for processing of the corresponding IO operation, and responsive to the particular one of the detected process tags being of the second type, the storage array provides a second type of data reduction different than the first type of data reduction for processing of the corresponding IO operation.

The first type of data reduction may comprise no data reduction, while the second type of data reduction may comprise a particular type of compression and/or deduplication. The storage array thereby provides different types of data reduction for different ones of the IO operations generated by different ones of the processes responsive to the process tags assigned to the respective IO operations by the given host device.

As a more particular example, the first and second processes may comprise respective log and database processes of a database application, with the IO operations generated by the log process of the database application having a data reduction control indicator specifying that data reduction should not be applied for those IO operations by the storage array, and with the IO operations generated by the database process of the database application having a data reduction control indicator specifying that data reduction should be applied for those IO by the storage array. In this manner, the storage array in the present example is able to implement data reduction on a per-process basis, controlled by a multi-path layer using the data reduction control indicators of the IO operations, even though the IO operations may be directed to the same storage device or group of storage devices. The different types of data reduction may be specified in particular fields of the process tags or may be apparent to the storage array from the different process tags as a whole.

After completion of step 208 for a given IO operation, the FIG. 2 process may return to step 200 in order to process additional IO operations using respective assigned process tags. For example, the FIG. 2 process may be iterated to process multiple IO operations from the given host device or from multiple host devices. Multiple such iterations may be performed at least in part in parallel with one another.

Separate instances of the FIG. 2 process may be performed in respective additional host devices that share the storage array.

The particular processing operations and other system functionality described in conjunction with the flow diagram of FIG. 2 are presented by way of illustrative example only, and should not be construed as limiting the scope of the disclosure in any way. Alternative embodiments can use other types of processing operations involving host devices, storage systems and per-process data reduction control functionality. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different per-process data reduction control arrangements within a given information processing system.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

An additional example of an illustrative embodiment implemented using the FIG. 2 process for per-process data reduction control will now be described. It is assumed in this embodiment that the MPIO driver of a given host device provides per-process data reduction control functionality, under the control of a corresponding data reduction control module implemented in the MPIO driver.

In this example, the storage system is illustratively configured utilizing an Oracle Aux Storage Pool (ASP) in which an Oracle file system performs striping of log process data and database process data across all LUNs in the ASP, which means the same LUN might receive both log and database write requests. It is generally not possible under conventional practice to provide different data reduction treatment for the log and database write requests, but in the present example the MPIO drivers of a multi-path layer of the host devices is configured to assign process tags comprising data reduction control indicators to respective ones of the write requests, with different data reduction control indicators being used for the log write requests and the database write requests. The storage system detects the process tags, identifies the data reduction control indicators, and based at least in part on those indicators is able to provide different data reduction treatment for the log and database write requests, even though they share common LUNs in the storage system. The process tags comprising the data reduction control indicators provide reduction hints to the storage system for each of the received write requests. The storage system can therefore use data reduction for the database write requests, but turn data reduction off for the log write requests.

Numerous alternative arrangements of these and other features can be used in implementing the FIG. 2 process and other illustrative embodiments. For example, in alternative embodiments the MPIO driver can be configured to send a list of storage devices for which data reduction should not be applied by the storage array. Such an arrangement could utilize a new VU mode select page command.

The illustrative embodiments disclosed herein can provide a number of significant advantages relative to conventional arrangements. For example, some embodiments configure a multi-path layer of one or more host devices to include functionality for controlling the performance of data reduction such as compression or deduplication on a per-process basis in an associated storage array or other type of storage system. The multi-path layer in such arrangements can be configured to specify for each of a plurality of processes executing on the host device whether or not the data associated with the corresponding IO operations should be subject to data reduction.

These embodiments provide fine-grained control in performance of data reduction within a storage system, thereby overcoming the problems that might otherwise result when utilizing storage systems that differentiate application of data reduction only on the basis of a storage device or a group of storage devices. For example, some embodiments can alter the performance of data reduction for IO operations of different processes of an application running on a given host device even when the IO operations of the different processes are all directed to the same storage device or group of devices within a storage array.

Such arrangements can avoid the need for a user to designate separate storage devices or groups of storage devices within a storage system for handling IO operations of each of the different processes of the application, while also avoiding the complexities and potential performance impacts of the above-noted out-of-band hinting approach.

Moreover, these arrangements can avoid the need for the storage system to perform compression or deduplication tests on a given logical storage volume or other storage device associated with one or more IO operations in order to determine its data reduction potential before deciding whether or not to apply data reduction to that logical storage volume or other storage device. As a result of an at least partial elimination of such tests, storage system performance is significantly improved.

It is to be appreciated that the particular advantages described above are associated with particular illustrative embodiments and need not be present in other embodiments. Also, the particular types of information processing system features and functionality as illustrated in the drawings and described above are exemplary only, and numerous other arrangements may be used in other embodiments.

It was noted above that portions of an information processing system as disclosed herein may be implemented using one or more processing platforms. Illustrative embodiments of such platforms will now be described in greater detail. These and other processing platforms may be used to implement at least portions of other information processing systems in other embodiments. A given such processing platform comprises at least one processing device comprising a processor coupled to a memory.

One illustrative embodiment of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as virtual machines, or portions thereof, are illustratively implemented for use by tenants of such a multi-tenant environment.

Cloud infrastructure as disclosed herein can include cloud-based systems such as Amazon Web Services, Google Cloud Platform and Microsoft Azure. Virtual machines provided in such systems can be used to implement a fast tier or other front-end tier of a multi-tier storage system in illustrative embodiments. A capacity tier or other back-end tier of such a multi-tier storage system can be implemented using one or more object stores such as Amazon S3, Google Cloud Platform Cloud Storage, and Microsoft Azure Blob Storage.

In some embodiments, the cloud infrastructure additionally or alternatively comprises a plurality of containers illustratively implemented using respective operating system kernel control groups of one or more container host devices. For example, a given container of cloud infrastructure illustratively comprises a Docker container or other type of LXC implemented using a kernel control group. The containers may run on virtual machines in a multi-tenant environment, although other arrangements are possible. The containers may be utilized to implement a variety of different types of functionality within the system 100. For example, containers can be used to implement respective compute nodes or storage nodes of a cloud-based system. Again, containers may be used in combination with other virtualization infrastructure such as virtual machines implemented using a hypervisor.

Another illustrative embodiment of a processing platform that may be used to implement at least a portion of an information processing system comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an application-specific integrated circuit (ASIC), a field-programmable gate array (FPGA), a graphics processing unit (GPU)

or other type of processing circuitry, as well as portions or combinations of such circuitry elements. The memory may comprise random access memory (RAM), read-only memory (ROM), flash memory or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

As another example, portions of a given processing platform in some embodiments can comprise converged infrastructure such as VxRail™, VxRack™, VxRack™ FLEX, VxBlock™ or Vblock® converged infrastructure from VCE, the Virtual Computing Environment Company, now the Converged Platform and Solutions Division of Dell EMC.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of host devices 102, SAN 104 and storage array 105 are illustratively implemented in the form of software running on one or more processing devices. As a more particular example, the data reduction control modules 114 may be implemented at least in part in software, as indicated previously herein.

It should again be emphasized that the above-described embodiments are presented for purposes of illustration only. Many variations and other alternative embodiments may be used. For example, the disclosed techniques are applicable to a wide variety of other types of information processing systems, utilizing other arrangements of host devices, networks, storage systems, storage arrays, storage devices, processors, memories, IO queues, MPIO drivers, data reduction control modules and additional or alternative components. Also, the particular configurations of system and device elements and associated processing operations illustratively shown in the drawings can be varied in other embodiments. For example, a wide variety of different MPIO driver configurations and associated per-process data reduction control arrangements can be used in other embodiments. Moreover, the various assumptions made above in the course of describing the illustrative embodiments should also be viewed as exemplary rather than as requirements or limitations. Numerous other alternative embodiments within the scope of the appended claims will be readily apparent to those skilled in the art.

What is claimed is:

1. An apparatus comprising:
   a host device configured to communicate over a network with a storage system comprising a plurality of storage devices;
   the host device comprising:
   a set of input-output queues; and
   a multi-path input-output driver configured to select input-output operations from the set of input-output queues for delivery to the storage system over the network;
   wherein the multi-path input-output driver is further configured:
   to determine data reduction control indicators for the input-output operations; and
   to provide the data reduction control indicators to the storage system in association with the input-output operations;
   wherein different data reduction control indicators are associated with different ones of the input-output operations that are generated by different processes running on the host device; and
   wherein the different data reduction control indicators associated with the different ones of the input-output operations are configured to permit the storage system to adapt its performance of data reduction for the different ones of the input-output operations based at least in part on their associated data reduction control indicators.

2. The apparatus of claim 1 further comprising one or more additional host devices each configured to communicate over the network with the storage system and wherein each additional host device comprises a set of input-output queues and a multi-path input-output driver configured to select input-output operations from the set of input-output queues for delivery to the storage system over the network.

3. The apparatus of claim 1 wherein a given one of the data reduction control indicators comprises at least one of a compression control indicator and a deduplication control indicator for at least one of the input-output operations.

4. The apparatus of claim 1 wherein a given one of the data reduction control indicators comprises a binary indicator specifying whether or not data reduction is to be applied by the storage system for at least one of the input-output operations that is associated with the given data reduction control indicator.

5. The apparatus of claim 1 wherein determining data reduction control indicators for respective ones of the input-output operations comprises:
   identifying a process that generated at least one of the input-output operations; and
   determining the data reduction control indicator for the process from a corresponding entry of a process table stored in a persistent memory of the host device.

6. The apparatus of claim 5 wherein the data reduction control indicator for the process is associated with all of the input-output operations generated by that process.

7. The apparatus of claim 5 wherein the data reduction control indicator comprises at least one of:
a compression control indicator stored in a compression field of the corresponding entry of the process table; and
a deduplication control indicator stored in a deduplication field of the corresponding entry of the process table.

8. The apparatus of claim 5 wherein the process table comprises a user-editable table that is automatically populated utilizing an application table comprising a plurality of entries for respective applications running on the host device with each such entry identifying one or more processes of the corresponding application.

9. The apparatus of claim 1 wherein providing the data reduction control indicators to the storage system in association with the input-output operations comprises:
configuring a process tag of a first one of the input-output operations generated by a first process to include a first data reduction control indicator of a first type;
configuring a process tag of a second one of the input-output operations generated by a second process to include a second data reduction control indicator of a second type; and
providing the first and second input-output operations and their respective process tags to the storage system.

10. The apparatus of claim 9 wherein configuring a process tag of a given one of the input-output operations to include a given one of the data reduction control indicators comprises combining the given data reduction control indicator with a base portion of the process tag wherein the base portion indicates a particular one of a plurality of different priority levels for processing of a corresponding input-output operation in the storage system.

11. The apparatus of claim 9 wherein the first and second processes comprise respective log and database processes of a database application and wherein input-output operations generated by the log process of the database application have a data reduction control indicator specifying that data reduction should not be applied for those input-output operations by the storage system and input-output operations generated by the database process of the database application have a data reduction control indicator specifying that data reduction should be applied for those input-output operations by the storage system.

12. The apparatus of claim 9 wherein the process tags are assigned to respective ones of the input-output operations by incorporating the process tags into respective command descriptor blocks of corresponding commands directed from the host device to the storage system over the network.

13. The apparatus of claim 1 wherein providing the data reduction control indicators to the storage system in association with the input-output operations comprises providing the data reduction control indicators to the storage system in respective process tags assigned to respective ones of the input-output operations by the multi-path input-output driver.

14. The apparatus of claim 1 wherein providing the data reduction control indicators to the storage system in association with the input-output operations comprises providing at least portions of a process table to the storage system for storage in a persistent memory of the storage system.

15. A method comprising:
configuring a multi-path input-output driver of a host device to communicate with a storage system over a network;
the multi-path input-output driver:
selecting input-output operations from a set of input-output queues of the host device for delivery to the storage system over the network;
determining data reduction control indicators for the input-output operations; and
providing the data reduction control indicators to the storage system in association with the input-output operations;
wherein different data reduction control indicators are associated with different ones of the input-output operations that are generated by different processes running on the host device; and
wherein the different data reduction control indicators associated with the different ones of the input-output operations are configured to permit the storage system to adapt its performance of data reduction for the different ones of the input-output operations based at least in part on their associated data reduction control indicators.

16. The method of claim 15 wherein determining data reduction control indicators for respective ones of the input-output operations comprises:
identifying a process that generated at least one of the input-output operations; and
determining the data reduction control indicator for the process from a corresponding entry of a process table stored in a persistent memory of the host device.

17. The method of claim 15 wherein providing the data reduction control indicators to the storage system in association with the input-output operations comprises providing the data reduction control indicators to the storage system in respective process tags assigned to respective ones of the input-output operations by the multi-path input-output driver.

18. A computer program product comprising a non-transitory processor-readable storage medium having stored therein program code of one or more software programs, wherein the program code, when executed by a host device comprising a multi-path input-output driver, the host device being configured to communicate over a network with a storage system, causes the multi-path input-output driver:
to select input-output operations from a set of input-output queues of the host device for delivery to the storage system over the network;
to determine data reduction control indicators for the input-output operations; and
to provide the data reduction control indicators to the storage system in association with the input-output operations;
wherein different data reduction control indicators are associated with different ones of the input-output operations that are generated by different processes running on the host device; and
wherein the different data reduction control indicators associated with the different ones of the input-output operations are configured to permit the storage system to adapt its performance of data reduction for the different ones of the input-output operations based at least in part on their associated data reduction control indicators.

19. The computer program product of claim 18 wherein determining data reduction control indicators for respective ones of the input-output operations comprises:

identifying a process that generated at least one of the input-output operations; and determining the data reduction control indicator for the process from a corresponding entry of a process table stored in a persistent memory of the host device.

20. The computer program product of claim 18 wherein providing the data reduction control indicators to the storage system in association with the input-output operations comprises providing the data reduction control indicators to the storage system in respective process tags assigned to respective ones of the input-output operations by the multi-path input-output driver.

\* \* \* \* \*